(12) United States Patent
Schwalm, Jr.

(10) Patent No.: US 12,278,517 B2
(45) Date of Patent: Apr. 15, 2025

(54) SYSTEM AND METHOD TO PROVIDE PORTABLE AND CONTINUOUS POWER SUPPLY WITH RE-CHARGING FEATURE

(71) Applicant: James Doyle Schwalm, Jr., Atlanta, GA (US)

(72) Inventor: James Doyle Schwalm, Jr., Atlanta, GA (US)

( * ) Notice: Subject to any disclaimer, the term of this patent is extended or adjusted under 35 U.S.C. 154(b) by 0 days.

(21) Appl. No.: 18/593,026

(22) Filed: Mar. 1, 2024

(65) Prior Publication Data
US 2024/0204563 A1 Jun. 20, 2024

Related U.S. Application Data

(63) Continuation of application No. 17/496,465, filed on Oct. 7, 2021, now Pat. No. 11,923,722.

(51) Int. Cl.
*H02J 9/06* (2006.01)
*H02J 7/00* (2006.01)

(52) U.S. Cl.
CPC .......... *H02J 9/062* (2013.01); *H02J 7/00036* (2020.01); *H02J 7/00047* (2020.01); *H02J 7/0013* (2013.01)

(58) Field of Classification Search
CPC .... H02J 9/062; H02J 7/00047; H02J 7/00036; H02J 7/0013
USPC .......................................................... 307/19
See application file for complete search history.

(56) References Cited

U.S. PATENT DOCUMENTS

| | | | |
|---|---|---|---|
| 9,145,082 B2 | 9/2015 | Hindle | |
| 10,391,873 B2 | 8/2019 | Kohnke | |
| 2009/0315393 A1* | 12/2009 | Yeh | B60L 1/00 307/10.1 |
| 2012/0112544 A1* | 5/2012 | Salcone | H02J 7/0048 307/65 |
| 2012/0146587 A1* | 6/2012 | Srinivasan | H01M 8/04925 307/64 |
| 2018/0037121 A1* | 2/2018 | Narla | H02J 3/38 |
| 2019/0393826 A1* | 12/2019 | Lai | H02S 40/32 |
| 2020/0276926 A1 | 9/2020 | Dewan | |

(Continued)

FOREIGN PATENT DOCUMENTS

| | | |
|---|---|---|
| WO | WO2017147644 | 9/2017 |
| WO | WO2020051109 | 3/2020 |
| WO | WO2021083535 | 1/2022 |

*Primary Examiner* — Hal Kaplan
*Assistant Examiner* — Swarna N Chowdhuri
(74) *Attorney, Agent, or Firm* — Snell & Wilmer LLP

(57) ABSTRACT

Disclosed are systems and methods to provide continuous power to electrical devices using a portable power supply unit and a portable power charging unit. The portable power supply unit may include a first battery providing a first DC output, at least one first inverter for converting said first DC output to a first AC output for powering the electrical devices and for converting a first AC input to a first DC input for charging said first battery. The portable power charging unit may include a second battery for providing a second DC output, a second inverter for converting said second DC output to a second AC output; and transmitting the second AC output to the first battery using charging ports on respective units such that said second AC output replaces said first AC output for powering said electrical devices, and replaces said first AC input for charging said first battery.

18 Claims, 3 Drawing Sheets

(56) References Cited

U.S. PATENT DOCUMENTS

| | | | |
|---|---|---|---|
| 2021/0170897 A1* | 6/2021 | Ellis | B60L 53/68 |
| 2022/0024334 A1* | 1/2022 | Marczi | H02J 7/342 |

* cited by examiner

SYSTEM AND METHOD TO PROVIDE PORTABLE AND CONTINUOUS POWER SUPPLY WITH RE-CHARGING FEATURE

RELATED APPLICATION DATA

This application is a continuation of U.S. application Ser. No. 17/496,465, filed Oct. 7, 2021, which prior application is incorporated by reference herein in its entirety.

FIELD OF THE INVENTION

The present disclosure relates to systems and methods for providing portable power supplies.

BACKGROUND OF THE INVENTION

Portable power supplies are used to provide power to electric devices at locations where transmission of cabled power is not available from utility companies. However, the portable power supplies have a number of limitations and problems. For example, some portable power supplies use generators which are powered by fossil fuels, contributing to pollution and greenhouse gasses. Some battery-powered supplies have been proposed, but these supplies provide a limited amount of power such that once depleted, the portable power supply must be recharged. Thus, these battery-powered supplies are typically for short term use, such as for a single event, or used as an add-on or back-up power supply.

The use of battery-powered portable power supplies is further limited due to the conventional methods of recharging the portable power supply. For example, once the battery power of a battery-powered portable power supply is depleted, the portable power supply may be transported to a charging station. This method presents several disadvantages. First, the portable power supply must be disconnected from the electrically-powered devices it was previously servicing, thus creating downtime in the use of said electronic devices. Second, the downtime is typically an extended period due to the time for transporting the portable power supply to and from the charging station, and for charging the portable power supply back to full. Third, transporting each portable power supply separately to a charging station creates traffic. Fourth, where a single power station may only service a limited number of mobile power supplies, additional mobile power supplies requiring charging must then wait in line.

As another option, a first depleted battery-powered portable power supply may be replaced or "swapped" with a second charged battery-powered portable power supply to service the same electronically powered devices. However, this "swapping" again necessarily requires disconnecting the electronically-powered devices from the first portable power supply and reconnecting the electronically-powered devices to the second portable power supply. This method of replacement still creates a blackout period when the electronic devices become inoperable. Thus, a more efficient system to provide power to remote locations, and method to provide power in a continuous fashion, are desired.

It is to be understood that some concepts, ideas and problem recognitions provided in this description of the Background may be novel rather than part of the prior art.

SUMMARY OF THE INVENTION

Various embodiments in accordance with the present disclosure of invention generally relate to a system for providing power which may include a portable power supply unit and a portable power charging unit. The portable power supply unit may include a first battery providing a first DC output, at least one first inverter for converting said first DC output to a first AC output and for converting a first AC input to a first DC input for charging said first battery; and a power output receiving said first AC output and configured to be electrically coupled to one or more electronic devices such that power is supplied from the first battery to the one or more electronic devices, and a first charging port in electrical communication with said first battery and said power output. The portable power charging unit may include a second battery for providing a second DC output, a second inverter for converting said second DC output to a second AC output; and a second charging port configured to be electrically coupled to the first charging port of the portable power supply unit such that said second AC output is provided to said power output of said portable power unit in replacement of said first AC output, and is provided to said at least one first inverter in replacement of said first AC input for charging said first battery.

As possible embodiments, the portable power supply unit may be a wheeled support. The wheeled support may include a trailer. The portable power charging unit may be a motorized vehicle.

In one embodiment, the portable unit may also include a monitor system configured to gather information comprising an amount of power in said first battery and an amount of power being drawn from said first battery. In the same or other embodiments, said monitor system may also include one or more of the following: a communication interface configured to send and receive data, a display device configured to display said gathered information, and/or a memory device and a controller configured to execute non-transitory machine-readable code stored in said memory device.

It is contemplated said portable power charging unit may also include a third inverter converting said second DC output to a third AC input such that said second AC input is provided to said power output, and said third AC input is provided to said at least one first inverter for charging said first battery.

Also disclosed is a method for charging a portable power supply unit while providing power to one or more electronic devices connected to said portable power supply unit, which may include the steps of (1) providing, via a portable power supply unit, power to said one or more electronic devices, (2) charging, via a portable power charging unit, said first battery, and (3) providing, via said second battery, power to said one or more electronic devices while charging said first battery.

The step of providing, via a portable power supply unit, power to said one or more electronic devices may include the additional steps of (i) providing, via a first battery in said portable power supply unit, a first DC output to at least one first inverter in said portable power supply unit, (ii) converting, via said first inverter, said first DC output to a first AC output to a power output in said portable power supply unit, and (iii) electrically coupling said power output to said one or more electronic devices.

The step of charging, via a portable power charging unit, said first battery may include the additional steps of (i) electrically connecting a first charging port on said first batter to a second charging port on a second battery in said portable power charging unit, said first charging port in electrical communication with said first battery and said power output, (ii) providing, via said second battery, a second DC output, (iii) converting, via a second inverter in said portable power charging unit, said second DC output to a first AC input, (iv) transmitting, via said second charging port, said first AC input to said first charging port and then to said first inverter, (v) converting, via said first inverter, said first AC input to a first DC input, and (vi) transmitting, via said first inverter, said first DC input to said first battery.

The step of providing, via said second battery, power to said one or more electronic devices while charging said first battery may include the additional steps of converting, via a third inverter in said portable power charging unit, said second DC output to a second AC input, and transmitting, via said second charging port, said second AC input to said first charging port and then to said power output.

Also disclosed is a system for providing power including a portable power supply unit and a portable power charging unit. The portable power supply unit may include a first battery providing a first DC output, at least one first inverter for converting said first DC output to a first AC output and for converting a first AC input to a first DC input for charging said first battery, a power output receiving said first AC output and configured to be electrically coupled to one or more electronic devices such that power is supplied from the first battery to the one or more electronic devices, a first AC charging port in electrical communication with said power output, and a first DC charging port in electrical communication with said first battery.

The portable power charging unit may include a second battery for providing a second DC output, a second inverter for converting said second DC output to a second AC input; and a second AC charging port configured to be electrically coupled to the first AC charging port such that said second AC input is provided to said power output in replacement of said first AC output, and a second DC charging port configured to be electrically coupled to the first DC charging port for charging said first battery.

As possible embodiments said portable power supply unit may include a wheeled support. Said wheeled support may include a trailer. Said portable power charging unit may be a motorized vehicle.

In one embodiment, said portable unit may include o a monitor system comprising configured to gather information comprising an amount of power in said first battery and an amount of power being drawn from said first battery. In the same or other embodiments, said monitor system may include one or more of the following: a communication interface configured to send and receive data, a display device configured to display said gathered information, and/or a memory device and a controller configured to execute non-transitory machine-readable code stored in said memory device.

It is contemplated said first AC charging port may also be in electrical communication with said power output via said first inverter.

Further aspects of the present disclosure of invention may be found in the following detailed descriptions.

DESCRIPTION OF THE DRAWINGS

The present disclosure may be better understood by reference to the following detailed description taken in conjunction with the accompanying drawings, which illustrate particular embodiments in accordance with the present disclosure of invention.

DETAILED DESCRIPTION OF THE INVENTION

Reference will now be made in detail to some specific embodiments in accordance with the present disclosure of invention. While the present disclosure is described in conjunction with these specific embodiments, it is not intended to limit the teachings of the present disclosure to the described embodiments. On the contrary, it is intended to cover alternatives, modifications, and equivalents as may be included within the spirit and scope of the teachings of the present disclosure.

In the following description, numerous specific details are set to provide a thorough understanding of the present disclosure. Particular embodiments may be implemented without some or all of these specific details. In other instances, well known process operations have not been described in detail in order not to unnecessarily obscure the present disclosure of invention.

Aspects of the invention comprise portable and re-chargeable power supplies, a system for providing portable power, and methods for providing portable power and re-charging portable power supplies.

One embodiment of a portable power supply system of the present invention may include three main components. First, a portable and re-chargeable power supply unit ("distribution mule"), which may be transported to a desired remote location (such as a location where a continuous power supply is not available) and used to supply electrical power to one or more electrical devices (devices that are powered by or require electrical power) at the remote location. Second, a portable power charging unit ("caravan"), which may be transported to the remote location of a distribution mule and used to recharge the power supply of the distribution mule. Third, a central charging and monitoring system or station which may include one or more charging stations used to charge the one or more caravans, and at least one control device or station used to monitor and manage the efficient charging of the caravans and distribution mules.

Figure 1:
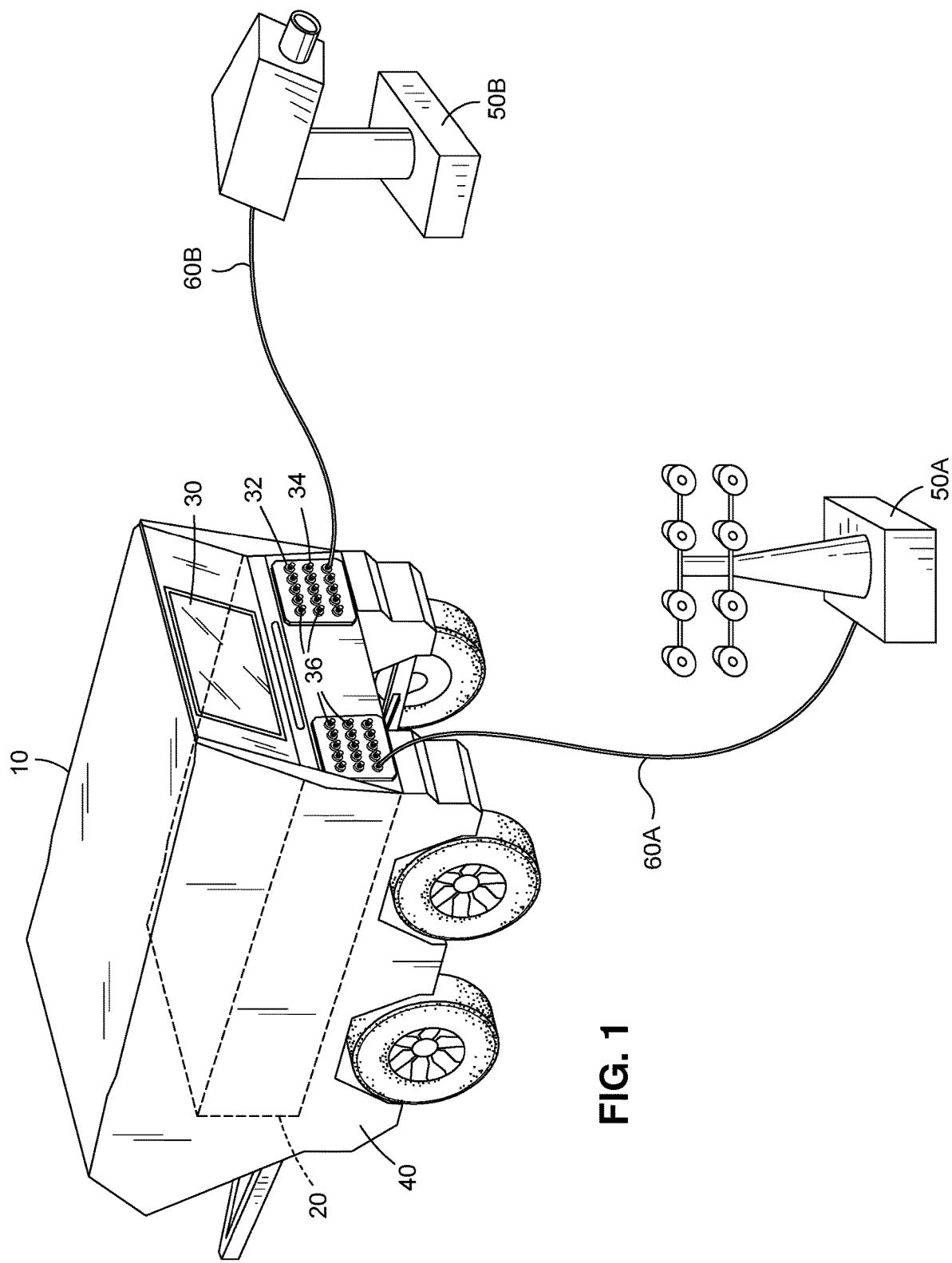
FIG. 1 illustrates an exemplary distribution mule.

FIG. 1 illustrates an exemplary portable supply unit or "distribution mule" 10. As indicated, the distribution mule 10 is preferably portable. In one embodiment, the distribution mule 10 comprises a power supply, and preferably a re-chargeable power supply in the form of one or more batteries or a battery unit 20. In order to render the portable power supply portable or transportable, the portable power supply may be part of or associated with a vehicle or otherwise be readily movable. In a preferred embodiment, the distribution mule 10 is not self-propelled, but is configured to be moved by another powered vehicle. As such, the distribution mule 10 may comprise a trailer 40 or other wheeled support. The one or more batteries 20 and other components of the distribution mule 10, such a control panel 30, may be associated with the trailer, such as by being supported on a supporting surface thereof or by being mounted to a frame or other support structure thereof. The trailer 40 or other transportable support might be open or enclosed, such as to form an enclosure which internally houses one or more components of the distribution mule 10.

In one embodiment, the one or more batteries 20 comprise one or more electrical power storage units, such as a plurality of batteries. The one or more batteries 20 may be of one or more types, such as lead-acid, nickel-cadmium (NiCd), nickel-metal hydride (NiMH), lithium-ion (Li-ion), lithium-ion polymer (LiPo) or other types now known or later developed. In one embodiment, the at least one battery 20 is rechargeable and can provide a DC output at a charge differential of 800V.

As indicated, the distribution mule 10 may comprise a control panel 30. The control panel 30 may include one or more of the following components: a mule control interface 32, a mule battery monitor system 34, and a plurality of mule power supply sockets or ports 36. Electrically-powered devices 50 may be connected to the mule power supply sockets or ports 36, such as via electric cables 60 having mating plugs. The sockets or ports 36 may comprise, for example, electrical sockets of the type used to provide 110, 208 or 220V AC electrical power, and might have various configurations, such as standard Type A thru Type O sockets, and be configured to receive two or three pins or blade plugs, etc.

Additional components of the distribution mule 10 are discussed below and illustrated in FIG. 3.

The mule control interface 32 may be used to control the flow of power from the at least one mule battery 20 to the mule power supply sockets or ports 36 (and thus to the electrically-powered devices connected thereto). Such control may include one or more switches or the like, such as for turning the power supply on or off, or to provide a desired power output, for each specific socket or all sockets at once.

The mule battery monitor system 34 is configured to monitor the amount of power remaining in the at least one battery 20, and the power usage through the mule power supply sockets or ports 36. The monitor system 34 may be configured to use information regarding the amount of power and the power usage to, for example, provide an output of the remaining time until the at least one mule battery 20 will be depleted (at least to a point below a current or desired load level) and require recharging. The monitored information may also be displayed on a display device (such as a video display) on the exterior of the distribution mule 10.

In one embodiment, the monitor system 34 preferably includes a communication interface. In one embodiment, the communication interface may comprise a wireless communication interface, such as for transmitting and receiving information over a cellular, radio or other network. In one embodiment, information received by or generated by the monitor system 34 may be transmitted to the central charging and monitoring system (discussed below and illustrated in FIG. 2). For example, the mule battery monitor system 34 may also be configured to transmit information regarding the current charge status of the at least one battery 20, the power usage, and/or to automatically and/or manually configured to alert the central charging system when the amount of power drops below a predetermined value or when the amount of calculated remaining time until battery discharge reaches a predetermined amount of time.

In one embodiment, the control interface 32 and/or monitor system 34 may comprise at least one controller. The controller may be hardwired, or might comprise a general processor which is configured to execute machine-readable code (e.g. "software") which is stored in a memory device. For example, the controller may, based upon execution of the software, be configured to receive information regarding a remaining charge of the at least one battery 20 and the rate of power consumption, such as to generate a time to discharge (e.g. an estimated time until the at least one battery 20 will have insufficient power to meet the load).

It is contemplated that the various components of the control panel 32, monitor system 34, and 36 may be located at separate locations on the distribution mule 10. The mule power supply sockets or ports 36 may also be located on more than one sides of the distribution mule 10 to provide easy access to electronic devices at various locations. In another embodiment, the distribution mule 10 may be configured to provide wireless charging.

The distribution mule 10 may include other features. For example, the one or more mule batteries 20 may be located in an enclosure. The enclosure may be configured with ventilation ports and/or cooling features such as fans or the like, in order to reduce the temperature of the batteries 20. In one embodiment, thermometers may be used to gather information regarding the temperature of the air around the batteries 20 and/or the batteries themselves. This information may be provide to the monitor system 34. In one embodiment, the monitor system 34 might reduce the supplied power, provide alerts or the like, in the event of a thermal overload. In one embodiment, said other features may be powered using a separate power source, such as a secondary battery, to ensure a minimum level of power supply to the electrically-powered devices 50.

Figure 2:
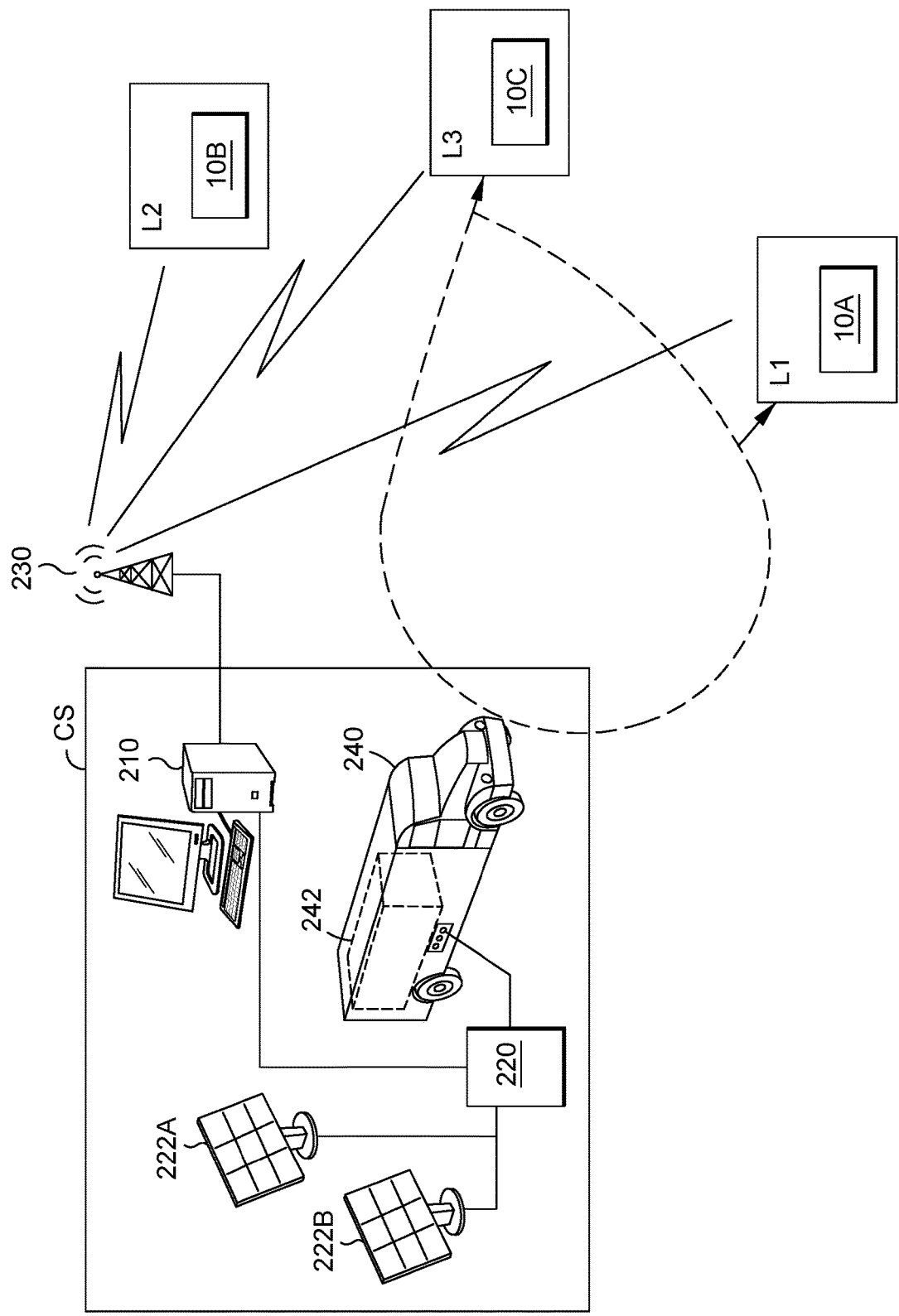
FIG. 2 illustrates the main components of the preferred embodiment of a portable power supply system with a plurality of distribution mules.

FIG. 2 illustrates one embodiment of a portable power supply system in accordance with the invention. In one embodiment, the system includes one or more distribution mules 10. As indicated, the distribution mules 10 may be located at one or more remote locations (such as locations L1, L2, L3) at which power is required. The one or more distribution mules 10 may be transported to and parked at each remote location, such as by connecting the trailer 40 thereof to a tow vehicle, such as a truck, transporting the distribution mule 10 to the remote location and then dropping it off at that location (where upon the truck may be used to transport other distribution mules 10). It will be appreciated that one distribution mule 10 or more than one might be used at a single location.

The system also comprises a central charging and monitoring station CS. The central charging and monitoring station CS may be located remotely from the remote locations. For example, the central charging and monitoring station CS might be located in a city, while the remote locations might be located remote from the central charging and monitoring station CS, such as outside of the city where a dedicated power supply is not available.

In one embodiment, the central charging and monitoring station CS is in communication with the distribution mules 10 via a communication interface. This interface may support wireless communications 230 with or between the station CS and the distribution mules 10, such as via one or more networks (LANs, WANs, the Internet, a cellular and/or radio communication system, etc., where such networks may include one or more wired communication links).

The central charging sand monitoring station CS may include one or more control devices 210 and one or more charging stations 220. As described in more detail below, the one or more charging stations 220 may be used to charge one or more recharging devices, or caravans 240, that may be used to re-charge the distribution mules 10 at the remote locations L1, L2, L3. In a preferred embodiment, when a distribution mule 10 is not in use at a remote location, it may be transported back to the central charging and monitoring station CS for storage and direct re-charging, such as via connection to one of the charging stations 210. In this manner, when a distribution mule 10 is delivered to a remote location L1, L2, L3, etc., it can be fully charged for use.

The control device 210 may include at least one server, which may include one or more processors or controllers, at least one communication device or interface, a database or other data storage device, and one or more additional memory or data storage devices (which may be separate from the database). In one or more embodiments, the processor(s) is configured to execute one or more instructions, such as in the form of machine-readable code (i.e. "software"), to allow the server to perform various functions. The software is preferably non-transitory, such as by being fixed in a tangible medium. For example, the software may be stored in the one or more memory devices. One or more of the memory devices may be read-only. In addition, the software may be stored on a removable medium in some embodiments. In general, the one or more memory devices are used as temporary storage. For example, the one or more memory devices may be random access memory or cache memory used to temporarily store some user information and/or instructions for execution by the at least one processor.

The charging stations 220 preferably comprise stations which are connected to a power supply and can provide power to a portable power device, such as via a cable connected to a socket of the charging station 220 and the portable power device. In a preferred embodiment, the power supply for the charging station 220 comprises a renewable energy source, such as one or more solar panels 222 (and associated power storage devices, etc.), but might comprise other power sources (such as via an electrical utility, etc.). The charging station 220 is configured to provide recharging power to a portable power device, e.g. a caravan 240 (or as described above, in certain instances, a distribution mule 10). The caravan 240 preferably comprises a mobile unit which has a power storage element, such as one or more caravan batteries 242 (discussed below and illustrated in FIG. 3). In one embodiment, the caravan 220 is self-powered, such as comprising a motorized vehicle such as a van, truck or the like, which can be driven (by a driver or autonomously) from the central charging and monitoring station CS to the one or more remote locations L1, L2, L3, etc. However, the caravan 240 might comprise other types of vehicles or the like, for transporting the one or more batteries 242.

As indicated, the caravans 240 include one or more power sources, such as at least one rechargeable battery 242. As described in more detail below, the at least one battery 242 may be charged at one of the charging stations 220 at the central charging and monitoring station 220 and then be transported to a remote location L1, L2, L3, etc., where the at least one battery 242 may preferably be used to: 1) re-charge the at least one battery 20 of the distribution mules 10 at the one or more remote locations and 2) supply power to the electrically-powered components that are connected to the distribution mules 10, during the mule re-charging process. In one embodiment, the caravan 220 is configured to transport additional mules batteries 20 or distribution mules 10 to remote location L1, L2, L3, etc. to provide backup power sources during or after charging.

Once again, the at least one caravan battery 242 may be of various types and configurations. In one embodiment, the at least one caravan battery 242 is configured to provide an amount of power which exceeds the maximum amount of power that can be supplied by an individual distribution mule 10. For example, the batteries 20 of a distribution mule 10 may be configured to provide 120 kWH of power, while the caravan batteries 242 may be configured to provide a multiple thereof, such as 6-10 times as much power (such as 1200 kWH of power).

As with the distribution mule 10, the caravan 240 may include additional components. For example, as illustrated in FIG. 3, the caravan 240 may include a controller 244, such as for monitoring the power level of the at least one caravan battery 242, for controlling one or more switches, etc.

Additional components of the caravan 240 are discussed below and illustrated in FIG. 3.

In a preferred embodiment, the distribution mules 10 may be in communication with the control device 210 (such as via the mule battery monitor systems 34). Upon determining and/or anticipation the amount of power in the mule battery 20 falling below a predetermined number (which may be based on current amount and/or usage), a charge order may be created to direct a caravan 240 to the distribution mules 10.

In one embodiment, users may manually alert the control device 210 and/or to place a charge order. Such manual alerts may be achieved via the mule control interface 32 or software applications running on user devices such as smartphones, personal computers, etc.

In a preferred embodiment, the at least one caravan battery 242 holds enough power to charge more than one distribution mule 10 from empty to full. Where outstanding charge orders exist for distribution mules 10 at more than one location L1, L2, L3, etc., the control device 210 may be configured to determine an optimal charging sequence, such as based upon a distance from the central charging and monitoring station CS to the one or more remote locations L1, L2, L3, the distance from one remote location to another, and the amount of power needed to recharge the one or more distribution mules 10, etc. For example, where distribution mules 10A and 10B both require charging, the control device 210 may determine distribution mule 10A at location L1 has a lower amount of power remaining, and the caravan 240 may be instructed to drive to location L1 to charge distribution mule 10A first. Further, the control device 210 may determine routing based upon an optimization of the number of distribution mules 10 that the caravan 240 can re-charge in a single delivery route. In one embodiment, the control device 210 may also be configured to determine an optional route for driving the caravan 240 to more than one location based on traffic and/or time travelled. Additionally, where more than one caravan 240 is needed, the control device 210 may be configured to determine the optimal sequence of charging and/or route for each caravan 240. As indicated, a driver may drive the caravan 240 to the one or more locations, including under the guidance of a route generated by the control device 210.

In one embodiment, the control device 210 may be configured to respond to additional requests from remote location L1, L2, L3, etc., such as reports for defective distribution mules 10 or request for additional distribution mules 10. In response, the control device 210 may create separate or additional charge orders for or delivery of additional mule batteries 20 or distribution mules 10, which may be achieved with caravans 240 or other transportation devices used to transport distribution mules 10.

Figure 3:
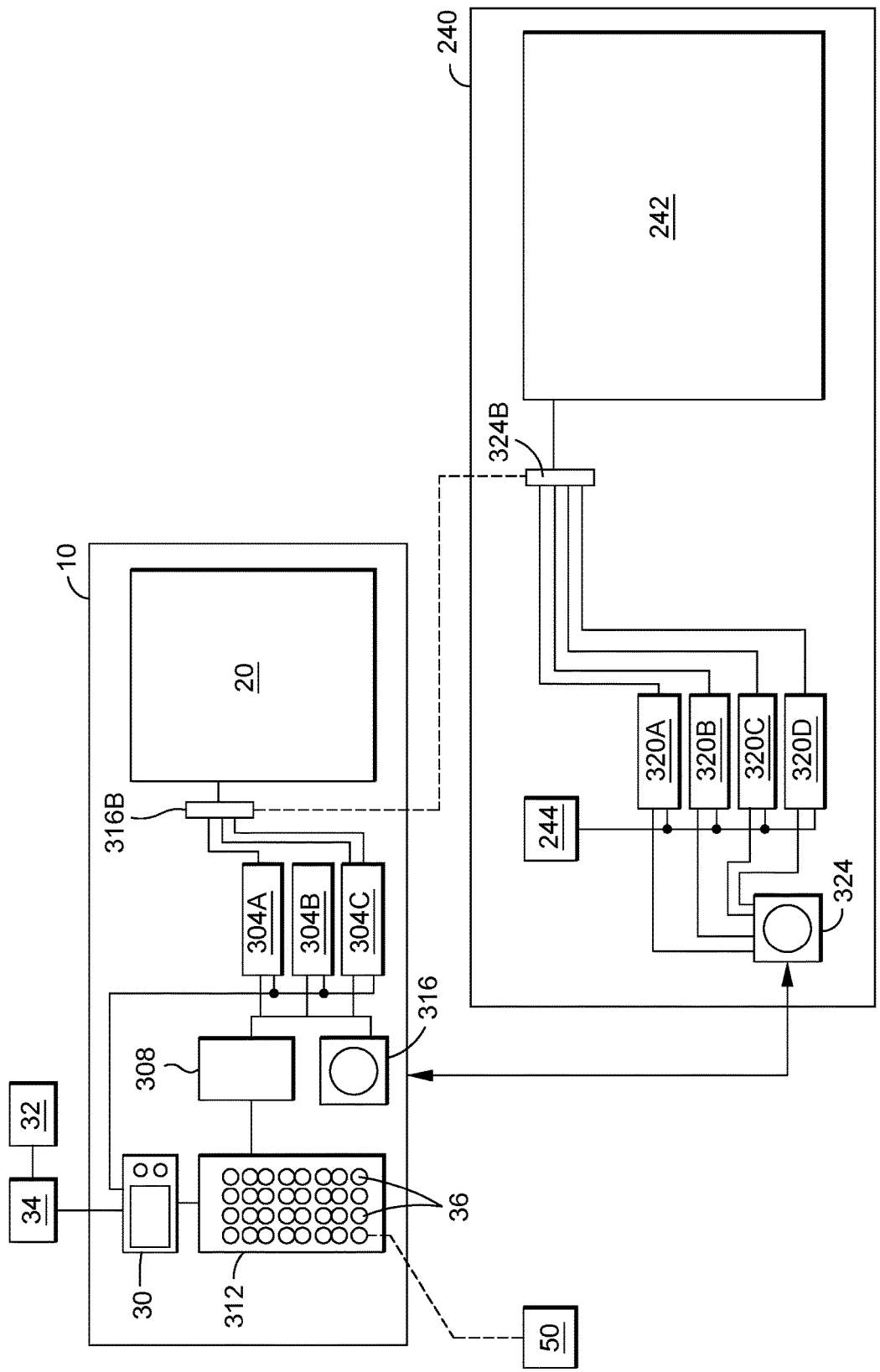
FIG. 3 illustrates a preferred embodiment of the power-related components in a distribution mule and a caravan.

FIG. 3 illustrates a preferred embodiment of the power-related components of a distribution mule 10 and a caravan 240. As illustrated in FIG. 3, a distribution mule 10 may include at least one or more of the following power-related components: the one or more mule batteries 20, one or more power inverters 304, one or more transformers 308, a power output 312, and a master mule charging port 316. As illustrated and discussed in more detail above, the distribution mule 10 may include additional components such as the monitor system 34 (such as for monitoring the power level of the at least one battery 20 and for controlling one or more output switches, etc.), and the control panel 30 and control interface 32.

In a preferred embodiment, the at least one mule battery 20 may provide a power supply of 800 V-DC and have 120 KWH capacity. The mule battery 20 may be electrically connected to the one or more mule inverters 304. In a one embodiment, there may be at least three mule inverters 304, each configured to convert 800 V-DC to 480 V-AC. The mule inverters 304 may be connected to both the transformer 308 and the mule charging port 316. In a preferred embodiment, the transformer 308 may be configured to reduce the power output voltage from 480 V-AC to 208 V-AC, or other desire voltage. The transformer 308 is connected to the power output 312, which may contain one or more mule power supply plugs 36 (as discussed above and illustrated in FIG. 1). In a preferred embodiment, the power output 312 may be configured to output power at 208 V-AC.

The mule charging port 316 may be used to charge the at least one mule battery 20, as described below, and provide a pathway of power therefrom to the power output 312.

The caravan 240 may include at least one or more of the following power-related components: the at least one caravan battery 242, one or more caravan inverters 320, and a master caravan charging port 324. In a preferred embodiment, the at least one caravan battery 242 may provide a power supply of 800 V-DC and have 1000 to 2000 KWH capacity. The caravan battery 242 may be electronically connected to the caravan inverters 320. In a preferred embodiment, there may be at least four caravan inverters 320, each may be configured to convert 800 V-DC 480 V-AC. The outputs of the caravan inverters 320 are connected to the caravan charging port 324.

Most importantly, the master caravan charging port 324 can be connected to the master mule charging port 316, such as via one or more cables. As described below, this allows the at least one caravan battery 242 to preferably: 1) charge the one or more mule batteries 20 and 2) supply required power to the electrical devices or components which are connected to the power output 312 of the distribution mule 10.

In particular, upon connecting the master mule charging port 316 to the master caravan charging port 324, the electrical output of one or more of the caravan inverters 320A, 320B, 320C is preferably placed in communication with the transformer 308 of the distribution mule 10, such that 480 V-AC power is provided by the caravan 240 to the transformer 308 of the distribution mule 10, and thereon (at preferably 208 V-AC) to the power output 312. In this manner, the caravan 240 provides the power required to power any electrical devices which are connected to the distribution mule 10 during the recharging process. At the same time, the 480 V-AC output from the caravan 240, such as via one of the inverters 320D thereof, is placed in communication with at least one of the mule inverters 304 such that the AC power which is output from the caravan 240 is converted to DC and is used to charge the one or more distribution mule batteries 20.

In another embodiment, the distribution mule 10 and/or caravan 240 may include other or additional master charging ports, such as two or more ports. As one example, the mule battery 20 may include a secondary charging port 316B, such as a DC charging port, and the caravan battery 242 may include a secondary charging port 324B, such as a DC charging port, allowing power to be directly transmitted from the caravan battery 242 for charging the mule battery 20 (such as, in a preferred embodiment, at 800 V-DC), while the caravan 240 also supplies an AC output to the distribution mule 10 (such as to the transformer 308 thereof) for continuing to power the electrical devices which are connected to the power output 312 of the distribution mule 10, via the connection of the master caravan port 324 to the master distribution mule port 316.

The improved charging method using a caravan inverter 320D to temporarily serve as the new power source to the power output 312 may permit the distribution mule 10 to continue to output power to any connected electronic devices 50 while charging. This configuration ensures continuous power output which allows the electronic devices to operate without downtime, which is desirable or necessary in many scenarios. For example, a preferred use of the distribution mule 10 may be for movie sets used in filming at remote locations, where the electronic devices 50 may include a plurality of lighting kits 50A, cameras 50B or the like, each requiring a source power. Continuous filming may be necessary, such that lighting kits must operate with no downtime. Movie staff may also require continuous power to maintain the operation of various electronic devices in their living quarters. The improved mobile power system and charging method may also be used in other remote-location activities such as mining, archaeology, construction, etc.

The caravan 240 has been described as having one or more inverters 320 for converting DC power to AC power. Further, the caravan 240 may be charged, such as by connecting the master caravan charging port 324 to a charging station 220, whereupon an AC power supply may be provided to the caravan 240 and may be converted to DC power (via the one or more inverters 320) for charging the at least one caravan battery 242. Of course, the caravan 240 might include one or more inverters for converting DC power from the battery to an AC output, and another one or more inventors for converting supplied AC power from the charging station 220 to DC power for charging the at least one caravan battery 242. In other embodiments, the charging station 220 might be configured to output DC power which can be used to charge the at least one caravan battery 242 directly (e.g., without use of an inverter).

Likewise, the distribution mule 10 might include separate inverters for converting DC power from the one or more batteries 20 thereof to AC, and for converting supplied AC power to DC for charging the one or more batteries 20 thereof.

In one embodiment, the distribution mule 10 and caravan 240 each have one or more batteries that provide 800V power. However, in other embodiments, particularly when DC to DC charging (of the distribution mule 10 via the caravan 240) is employed, it may be desirable for the voltages to differ, preferably by having the battery voltage of the caravan 240 higher than that of the distribution mules 10.

Although many of the components and processes are described above in the singular for convenience, it will be appreciated by one of skill in the art that multiple components and repeated processes can also be used to practice the techniques of the present disclosure. As used herein, the term "and/or" implies all possible combinations. In other words, A and/or B covers, A alone, B alone, and A and B together.

While the present disclosure of invention has been particularly shown and described with reference to specific embodiments thereof, it will be understood by those skilled in the art that changes in the form and details of the disclosed embodiments may be made without departing from the spirit or scope of the present teachings. It is therefore intended that the disclosure be interpreted to include all variations and equivalents that fall within the true spirit and scope of the present teachings.

What is claimed is:

1. A system for providing power comprising:
a plurality of portable power supply units each configured to be disposed in a corresponding remote location, each of said plurality of portable power supply units comprising:
  a first battery providing a first DC output;
  at least one first inverter for converting said first DC output to a first AC output and for converting a first AC input to a first DC input for charging said first battery;
  a power output receiving said first AC output and configured to be electrically coupled to one or more electronic devices such that power is supplied from the first battery to the one or more electronic devices;
  a first charging port in electrical communication with said first battery and said power output;
one or more portable power charging units, each of said portable power charging units comprising:
  a movable platform which supports:
  a second battery for providing a second DC output;
  a second inverter for converting said second DC output to a second AC output; and
  a second charging port configured to be electrically coupled to the first charging port of one of the portable power supply units; and
a central charging and monitoring system configured to, from a central location remote from the corresponding remote location, remotely direct movement of the portable power charging units from the central charging and monitoring system to one or more of the remote locations for re-charging of the portable power supply units at the one or more remote locations, comprising:
  one or more charging stations for charging the portable power supply units at the central location before being located at a corresponding one of the remote locations and for charging the one or more portable power charging units, and
  at least one control device for managing charging of the portable power supply units and the portable power charging units.

2. The system according to claim 1, wherein the at least one control device is configured to receive alerts via a communication interface from each of the portable power supply units corresponding to an amount of power dropping below a predetermined value.

3. The system according to claim 1, wherein the at least one control device is configured to receive alerts via a communication interface from each of the portable power supply units corresponding to an amount of calculated time remaining until battery discharge reaches a predetermined amount of time.

4. The system according to claim 3, wherein the at least one control device is configured to automatically receive said alerts via said communication interface.

5. The system according to claim 1, wherein the at least one control device is configured to receive alerts via a communication interface corresponding to a current charge status of the first battery.

6. The system according to claim 1, wherein the at least one control device is configured to receive alerts via a communication interface corresponding to a power usage of the first battery.

7. The system according to claim 1, wherein the first battery is configured to hold a first amount of power, wherein the second battery is configured to hold a second amount of power, and wherein the second amount of power is at least two times the first amount of power.

8. The system according to claim 1, wherein the at least one control device is configured to determine an optimal charging sequence for the portable power supply units and the portable power charging units based upon a distance between each of the portable power supply units and the one or more charging stations, a distance between each said corresponding remote location, and an amount of power needed to recharge the first battery of each of the portable power supply units.

9. The system according to claim 1, wherein said second AC output is provided to said power output of said one of the portable power supply units in replacement of said first AC output in order to supply power from said power output of the one of the portable power supply units to the one or more electronic devices without interruption.

10. The system according to claim 1, wherein said second AC output is configured to be provided to said at least one first inverter as said first AC input for conversion of said first AC input into said first DC input for charging said first battery of the one of the portable power supply units from said second battery of said each of said portable power charging units.

11. A method of recharging a plurality of portable power supply units at a plurality of remote locations, each of the portable power supply units having a first battery and a first inverter for converting a first DC output of said first battery to a first AC output and for converting a first AC input to a first DC input for charging said first battery, the method comprising:
  charging, via one or more charging stations at a central charging and monitoring system, a second battery of a portable power charging unit, said portable power charging unit comprising a drivable vehicle, a second battery for providing a second DC output, and a second inverter for converting said second DC output to a second AC output;
  receiving an alert corresponding to a need to recharge at least one of the portable power supply units;
  driving the portable power charging unit to the at least one of the portable power supply units; and
  connecting the second AC output of the portable power charging unit to the at least one of the portable power supply units in order to provide the second AC output in replacement of the first AC output and to simultaneously charge the corresponding first battery via said first DC input.

12. The method according to claim 11, further comprising:
  routing the portable power charging unit to other of the portable power supply units.

13. The method according to claim 12, wherein routing is based upon a distance between each of the portable power supply units and the one or more charging stations, a distance between each of the remote locations, and an amount of power needed to recharge the first battery of each of the portable power supply units.

14. The method according to claim 11, further comprising:

charging a number of the portable power supply units at the one or more charging stations;

routing each of the portable power supply units to the plurality of remote locations; and recharging the portable supply units with the portable power charging unit at the plurality of remote locations.

15. The method according to claim 14, further comprising:

receiving the alert at a control device of the central charging and monitoring system via a communication interface, the alert corresponding to a current charge status of the first battery.

16. The method according to claim 14, wherein the first battery is configured to hold a first amount of power, wherein the second battery is configured to hold a second amount of power, and wherein the second amount of power is at least two times the first amount of power.

17. The method according to claim 11, wherein the alert corresponds to an amount of power dropping below a predetermined value.

18. The method according to claim 11, wherein the alert corresponds to an amount of calculated time remaining until battery discharge reaches a predetermined amount of time.

* * * * *